(12) United States Patent
Hu

(10) Patent No.: US 7,378,171 B2
(45) Date of Patent: May 27, 2008

(54) FUEL CELL

(75) Inventor: Liqing Hu, Shanghai (CN)

(73) Assignee: Shen-Li High Tech Co., Ltd, Shanghai (CN)

( * ) Notice: Subject to any disclaimer, the term of this patent is extended or adjusted under 35 U.S.C. 154(b) by 669 days.

(21) Appl. No.: 10/912,403

(22) Filed: Aug. 4, 2004

(65) Prior Publication Data
US 2005/0031932 A1 Feb. 10, 2005

(30) Foreign Application Priority Data
Aug. 4, 2003 (CN) .............................. 03 1 42043

(51) Int. Cl.
*H01M 8/10* (2006.01)
(52) U.S. Cl. .............................. 429/30; 429/34; 429/24
(58) Field of Classification Search .................. 429/30, 429/34, 38, 17, 26, 24; 210/502.1, 503, 428, 210/453
See application file for complete search history.

(56) References Cited

U.S. PATENT DOCUMENTS 4,145,280 A * 3/1979 Middelbeek et al. ........ 210/665
2007/0003800 A1* 1/2007 Dallas et al. ................. 429/12

* cited by examiner

*Primary Examiner*—Raymond Alejandro
(74) *Attorney, Agent, or Firm*—Raymond Y. Chan; David and Raymond Patent Firm

(57) ABSTRACT

A fuel cell includes a membrane electrode assembly, a fuel storage reservoir, an air supply unit, a temperature regulator, and a particulates blocking device. The particulates blocking device includes an multi-layer air filtering unit communicated with the air supply unit for blocking unwanted particulates from the air supplied by the air supply unit. The air filtering unit includes a particle filter layer having a plurality of porous gratings formed thereon for allowing molecules which are smaller than a size of the gratings to pass therethrough, and a molecular filler layer having a plurality of filler grains chemically bound together for absorbing a predetermined kinds of molecules so as to block the molecules from entering into the membrane electrode assembly.

20 Claims, 2 Drawing Sheets

PIROR ART

FUEL CELL

BACKGROUND OF THE PRESENT INVENTION

1. Field of Invention

The present invention relates to a fuel cell, and more particularly to an electrochemical fuel cell comprising a particulates blocking device which effectively filters and prevents ultra-fine organic particulates from entering into fuel cell, so as to significantly prolong a life span thereof.

2. Description of Related Arts

Referring to FIG. 1 of the drawings, a conventional fuel cell typically comprises a membrane electrode assembly 1, a fuel storage reservoir 2 adapted for storing fuel hydrogen of the fuel cell, a pressure-relief valve 3 connected with the fuel storage reservoir 2 for adjustably releasing hydrogen fuel, an air filter 4 adapted for filtering incoming air, an air compressor 5 connected with the air filter 4 for compressing the in coming air into a predetermined pressure, a water-vapor separator 6, a water tank 7, a water pump 8, a heat exchanger 9, and a hydrogen circulating pump 10.

As a matter of conventional art, the fuel cell is a particular kind of electrochemical energy conversion device which is capable of converting the hydrogen and oxidant into electrical energy. The core part of the fuel cell is the membrane electrode assembly 1 (MEA). The MEA 1 usually comprises a proton exchange membrane sandwiched by two porous sheets made of conductive material such as carbon tissue. At the same time, a layer of catalyst like metal platinum powder, adapted for facilitating the electrochemical reaction, are evenly and granularly provided on two layers of carbon tissue to form two catalytic interfaces. Furthermore, electrically conductible members are provided on two sides of MEA to form a cathode and an anode, in such a manner, electron generated from the electrochemical reaction are capable of being lead out through an electrical circuit.

The anode of the MEA is supplied with fuel, such as hydrogen, for initiating the electrochemical reaction. The fuel is forced through the porous and diffused carbon tissue, and is capable of being deionized on the catalytic interface for the loss of electrons to generate positive ions. Moreover, positive ions are capable of transferably penetrating the proton exchange membrane to reach the cathode. On the other hand, an oxidant-containing gas, such as air, is supplied to the cathode of the MEA. Accordingly, the oxidant-containing gas is able to penetrate the porous and diffused carbon tissue to be ionized for the addition of the electrons to generate negative ions. Finally, the positive ions transferred from the anode will meet the negative ions to form reaction product.

In the electrochemical fuel cells which employ the hydrogen as the fuel and oxygen containing air as the oxidant, the electrochemical reaction on the anode generates hydrogen positive ions (protons). The proton exchange membrane is capable of facilitating the hydrogen positive ions migrate from the anode to the cathode. In addition, the proton exchange member has another function as a separator for blocking hydrogen containing air flow from being directly contacted with the oxygen containing air flow so as to prevent the mixture of hydrogen and oxygen as well as the explosive reaction.

The electrochemical reaction on the cathode side of fuel cell generates negative ions by obtaining the electrons. As a result, the negative ions generated on the cathode side will attract the positive ions transferred from the anode side to form water molecule as reaction product. In the electrochemical fuel cells which utilized the hydrogen as the fuel and oxygen containing air as oxidant, the electrochemical reaction is expressed by the following formula:

Anode: $H_2 \rightarrow 2H^+ + 2e$

Cathode: $\frac{1}{2}O_2 + 2H^+ + 2e \rightarrow H_2O$

In the typical proton exchanging membrane fuel cell, the MEA is disposed between two electrically conductible electrode plates wherein the contacting interface of each electrode plate at least defines one flowing channel. The flowing channel could be embodied by conventional mechanical method such as pressure casting, punching, and mechanical milling. The electrode plate could be embodied as metal electrode plate or graphite electrode plate. So the flowing channels defined on the electrode plate are capable of directing fuel and oxidant into anode side and cathode side respectively positioned on opposite side of the MEA. For a single fuel cell structure, only one MEA is provided and disposed between an anode plate and a cathode plate. Here, the anode plate and the cathode plate not only are embodied as current-collecting device, but also as a supporting device for securely holding the MEA. The flowing channels defined on the electrode plate are capable of delivering fuel and oxidant to the catalytic interfaces of the anode and cathode, and removing the water discharged from the electrochemical reaction of fuel cell.

To increase the overall power output of the proton exchanging membrane fuel cell, two or more fuel cells are electrically connected in series with a stacked manner or a successive manner to form a fuel cell stack. In such stacked series manner, each electrode plate comprises flowing channels defined on opposite side of plate respectively wherein one side of the electrode plate is applied as an anode plate contacting with the anode interface of a MEA, while another side of the electrode plate is applied as a cathode plate contacting with the cathode interface of an adjacent MEA. That is to say, one side of such electrode plate serve as an anode plate for one cell body and the other side of plate serve as a cathode plate for the adjacent cell. Within the art, this kind of structure is called bipolar plate. However, in the successive series manner, a plurality of single cell bodies are connected successively, wherein a front end unipolar plate and rear end unipolar plate as well as a fastening member are provided to form an overall fuel cell.

It has been practiced in the art to use such fuel cells as power unit for propelling vehicles including four-wheeled motor vehicles and motorcycles and operating other electrically operated machines such as portable generators.

A primary object of the fuel cell power unit for propelling vehicles, ships, and portable generators is to provide an extended and stable service. As a result, to guarantee the stable service, the fuel gas supplied to the fuel cell like hydrogen and oxidants containing air are required to be of a good quality. Nowadays, a common method for supplying quality air and hydrogen to the fuel cell is to equip the fuel cell with an air filter and a hydrogen filter for screening the dust of micron and submicron sizes in the air.

However, there exist adverse factors which affect (shorten) the lifespan of the conventional fuel cell, the main being the existence of dust of micron and submicron sizes, plus the general failure to block those extra small particulates entering into the fuel cell. Moreover, there also exist by a kind of organic oily molecules, which are of ultra-submicron size, suspended and mixed with normal air molecules. This kind of organic oily molecules is capable of penetrating through the most precise filter and enters into the fuel cell.

The overall performance of the fuel cell is definitely affected, and the culmination of those ultra small particulates inside the fuel cell would eventually deteriorate the original chemical and physical interaction of all the elements of the fuel cell, thus significantly reducing the lifespan of the conventional fuel cell in question.

SUMMARY OF THE PRESENT INVENTION

A main object of the present invention is to provide a fuel cell comprising a particulates blocking device which effectively filters and prevents ultra-fine organic particulates from entering into fuel cell, so as to significantly prolong a life span thereof.

Another object of the present invention is to provide a fuel cell which generates power by utilizing optimal quality of fuel so as to maximize the cell's efficiency and effectiveness and therefore, minimize the running cost of the present invention.

Another object of the present invention is to provide a fuel cell which is capable of generating maximum power with maximum efficiency as compared with conventional fuel cell, yet it does not involve complicated or expensive chemical or mechanical components. Thus, the manufacturing cost and the ultimate selling price of the present invention can be minimized.

Accordingly, to achieve the above mentioned object, the present invention provides a fuel cell, comprising:

a membrane electrode assembly adapted for generating electricity by a predetermined amount of fuel and air chemically reacted;

a fuel storage reservoir communicated with the membrane electrode assembly and adapted for storing the fuel to supply to the membrane electrode assembly for generating the electricity;

an air supply unit communicated with the membrane electrode assembly for supplying the air with a predetermined pressure to the membrane electrode assembly for generating the electricity;

a temperature regulator communicated with the membrane electrode assembly to control a temperature therein for ensuring efficient generation of the electricity; and a particulates blocking device comprising an multi-layer air filtering unit communicated with the air supply unit for blocking unwanted particulates from the air supplied by the air supply unit, wherein the air filtering unit comprises a particle filter layer having a plurality of porous gratings formed thereon for allowing molecules which are smaller than a size of the gratings to pass therethrough, and a molecular filler layer having a plurality of filler grains chemically bound together for absorbing a predetermined kinds of molecules so as to block the molecules from entering into the membrane electrode assembly.

These and other objectives, features, and advantages of the present invention will become apparent from the following detailed description, the accompanying drawings, and the appended claims.

DETAILED DESCRIPTION OF THE PREFERRED EMBODIMENT

Figure 1:
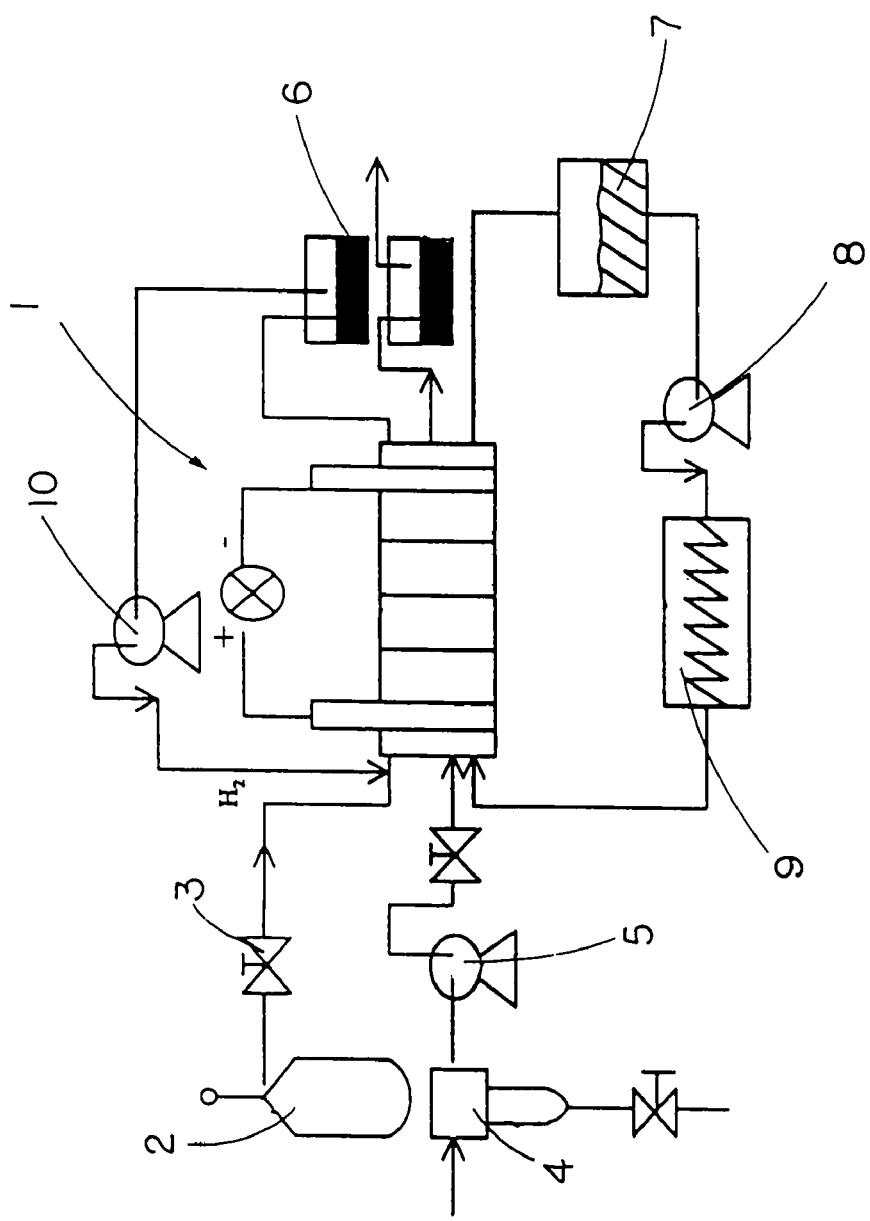
FIG. 1 is a conventional fuel cell.
Figure 2:
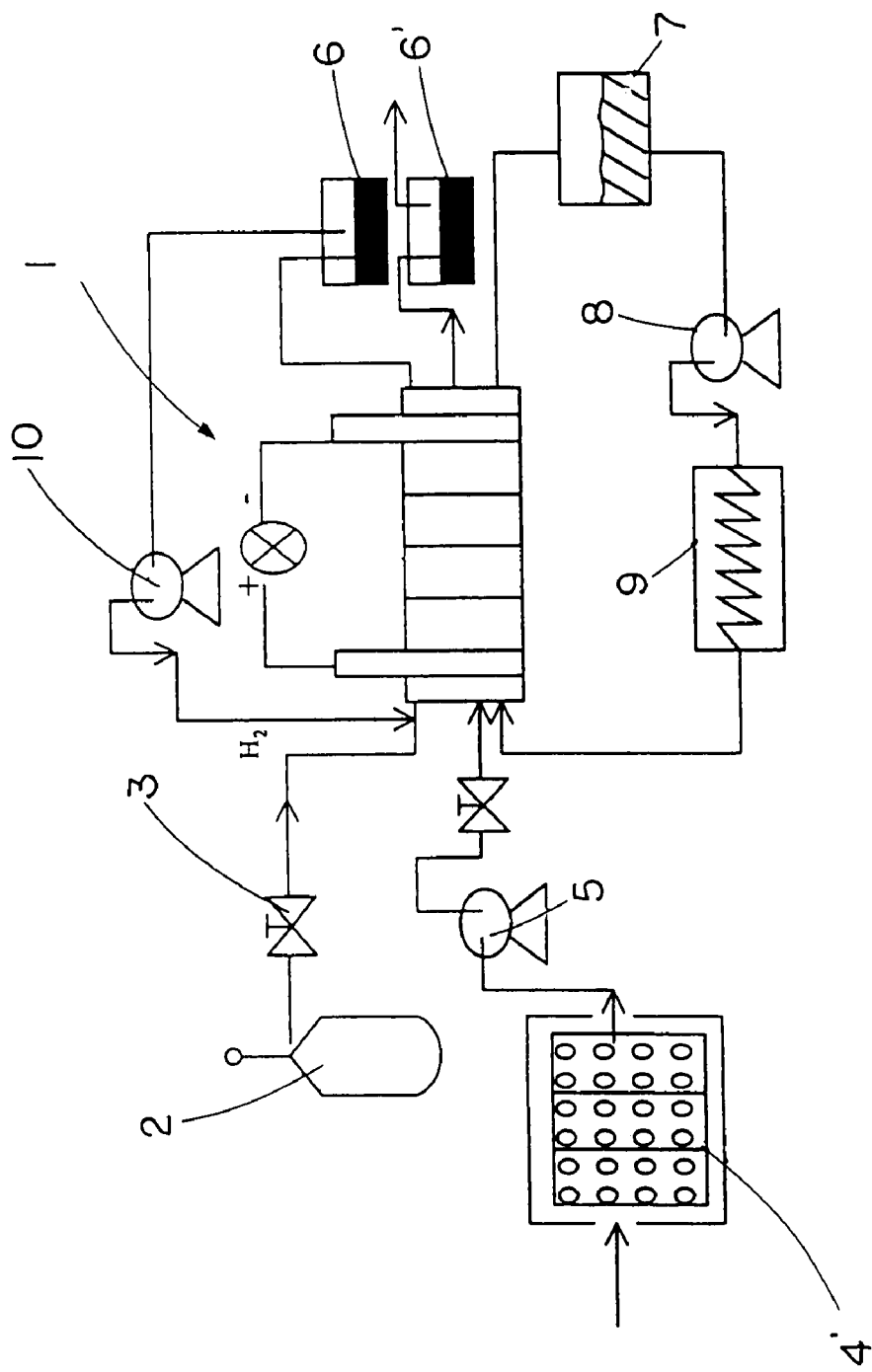
FIG. 2 is a schematic diagram of a fuel cell according to the preferred embodiment of the present invention.

Referring to FIG. 2 of the drawings, a fuel cell according to a preferred embodiment of the present invention is illustrated, wherein the fuel cell comprises a membrane electrode assembly 1 (MEA), a fuel storage reservoir 2 communicated with the MEA 1 for supplying fuel thereto, an air supply unit communicated with the MEA 1 for supplying air of a predetermined pressure thereto, and a temperature regulator communicated with the MEA 1 for regulating a temperature thereof so as to ensure an optimal efficiency of power generation process within the MEA 1.

The fuel storage reservoir 2 is arranged to store a predetermined amount of fuel, preferably in gaseous state, of a predetermined pressure, and to controllably release the fuel to the MEA 1 where chemical reaction with water and air takes place to generate power. According to the preferred embodiment, the fuel utilized by the fuel cell of the present invention is hydrogen gas which is stored in the fuel storage reservoir 2.

The air supply unit comprises an air compressor 5 communicated with the MEA 1 and adapted for drawing a predetermined amount of air therethrough for reacting with the hydrogen gas supplied by the fuel storage reservoir 2. The air may be drawn from ambient or from a specific inlet, such as an air inlet of a motor vehicle.

As shown in FIG. 2 of the drawings, the temperature regulator utilizes water as a cooling agent for regulating the temperature of the MEA 1 in order to provide an optimal temperature inside the MEA 1 for the chemical reaction to take place. Accordingly, the temperature regulator comprises a water tank 7 adapted for storing a predetermined amount of water, and communicated with the MEA 1, a heat sink 9 communicated with the water tank 7, and a water pump 8 connected between the heat sink and the water tank 7 for delivering a predetermined amount of pumping pressure for drawing water to circulate at a predetermined flow rate between the MEA 1, the heat sink 9, and the water tank 7.

As a result, one skilled in the art would have appreciated that the operation mechanism of the temperature regulator should be as follows: the water at a lower predetermined temperature flows into the MEA 1 where it extracts heat from the chemical reaction which generates power, thus increasing its temperature. The water then goes out from the MEA 1 and heads for the heat sink 9 where the higher water temperature is cooled to a predetermined lower temperature. The cooled water is then fed back into the water tank for next round of circulation powered by the water pump 8.

In order to ensure maximum efficiency, the fuel cell further comprises a particulates blocking device communicated with the air supply unit for filtering and blocking unwanted and ultra fine particulates from the air provided by the air supply unit. The particulates blocking device comprises a multi-layer air filtering unit 4 4' communicated with the MEA 1 for blocking such unwanted particles as dust particles, and ultra fine organic particulates from ambient air or from air inlet of a motor vehicle.

The air filtering unit 4 4' comprises at least a particle filter layer having a plurality of porous gratings formed thereon for allowing molecules which are smaller than a predetermined size to pass through that particle filter layer. According to the preferred embodiment, each of the porous gratings has a size approximately equal 1 millimeter such that any particles or molecules having a size greater than 1 millimeter will be substantially blocked by the porous gratings.

Moreover, the air filtering unit 4 4' further comprises at least a molecular filler layer having a plurality of filler grains chemically bound together to form a particles absorptive layer of a predetermined thickness, wherein the molecular filler layer is adapted to chemically absorb at least one predetermined kind of molecules from the incoming air so as to prevent those molecules from entering into the MEA 1. According to the preferred embodiment, the filler grains are embodied as activated carbon molecules the chemical feature of which are adhesive to a wide variety of organic molecules having a molecular structure similar to oil (organic oily molecules), so as to effectively prevent those organic oily molecules from entering into the MEA 1.

Of course, it is worth mentioning that the filler grains may also be embodied as others kinds of molecular absorbents which are capable of blocking a predetermined kind of molecules by chemically adhering thereto.

Referring to FIG. 2 of the drawings, the molecular filler layer and the particle filter layer are arranged in a side-by-side manner wherein ambient air is arranged to first pass through the particle layer for filtering relatively larger particles as well as molecules, and then the molecular filler layer for filtering relatively smaller particles and molecules, especially ultra fine respiratory particulates. This arrangement ensures that the molecular filler layer, which filters by way of absorption, is maximally utilized for filtering ultra fine particles in order to achieve maximum efficiency thereof. As such, unwanted particles, especially carbon particulates or organic molecules, can be effectively and efficiently blocked and absorbed by the air filtering unit 4 4' of the fuel cell of the present invention, and that the operation cost of the fuel cell of the present invention can be minimized. Moreover, the absence of unwanted particles in the MEA 1 effectively prolongs a lift span of the present invention, for little unwanted materials are allowed to enter the MEA 1 to affect the chemical reaction taken place therein.

In order to generate electricity, the MEA 1 is preferably embodied as a regular membrane electrode assembly, such as that mentioned above. In other words, as an illustration, the MEA 1 usually comprises a proton exchange membrane sandwiched by two porous sheets made of conductive material such as carbon tissue. At the same time, a layer of catalyst like metal platinum powder, adapted for facilitating the electrochemical reaction, are evenly and granularly provided on two layers of carbon tissue to form two catalytic interfaces. Furthermore, electrically conductible members are provided on two sides of MEA to form a cathode and an anode, in such a manner, electron generated from the electrochemical reaction are capable of being lead out through an electrical circuit.

The anode of the MEA is supplied with fuel, which is preferably embodied as such as hydrogen, supplied from the fuel storage reservoir 2 for initiating the electrochemical reaction. The fuel is forced through the porous and diffused carbon tissue, and is capable of being deionized on the catalytic interface for the loss of electrons to generate positive ions. Moreover, positive ions are capable of transferably penetrating the proton exchange membrane to reach the cathode. On the other hand, an oxidant-containing gas, such as air supplied from the air supply unit, is supplied to the cathode of the MEA 1. Accordingly, the oxidant-containing gas is able to penetrate the porous and diffused carbon tissue to be ionized for the addition of the electrons to generate negative ions. Finally, the positive ions transferred from the anode will meet the negative ions to form reaction product, wherein the ions transfer process generates electricity.

Referring to FIG. 2 of the drawings, the fuel cell further comprises a pressure regulator 3 communicated with the fuel storage reservoir 2 and the MEA 1 for controllably releasing fuel gas from the fuel storage reservoir 2 and the MEA 1 so as to regulate a pressure of the fuel, which is hydrogen gas according to the preferred embodiment of the present invention. The pressure regulator is preferably embodied as a pressure relief valve installed between the MEA 1 and the fuel storage reservoir 2. In other words, the pressure relief valve controls a rate of chemical reaction taken place in the MEA 1.

It is worth mentioning that as a matter of basic chemistry, the chemical reaction taken place in the MEA 1 results a mixture which contains water and residual hydrogen gas and residual air, the former two are to be withdrawn from the MEA 1 for reuse, and the latter being discharged from the fuel cell.

Thus, the fuel cell further comprises a chemical separator comprising a gas separator 6 communicated with an outlet of the MEA 1 for separating the hydrogen gas from the mixture, and a liquid separator 6' communicated with the MEA 1 for retrieving air from the mixture and discharging the air from the fuel cell. The separated hydrogen gas is then fed back into the fuel storage reservoir 2 by a circulating pump 10 communicated between the gas separator 6 and the fuel storage reservoir 2.

From the forgoing descriptions, it can be shown that the above objects have been substantially accomplished. The present invention effectively provides a fuel cell which ensures that the optimal quality of hydrogen and air are utilized to generate power, so as to maximize the efficiency as well as effectiveness of the present invention.

As an alternative mode of the present invention at an attempt to improve the filtering performance of the particulates blocking device, the air filtering unit 4 4' comprise one particle filter layer and a plurality of molecular filler layers wherein the air from the air supply unit is first passes through the particle filter layer and then to the molecular filler layers before entering into the MEA 1. As a result, it is easy to conceive that different molecular filler layers can be adapted to absorb different kinds of molecules or particulates such that air supplying to the MEA 1 is maximally filtered to ensure optimal generation of electricity.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A fuel cell, comprising:

a membrane electrode assembly adapted for generating electricity by a predetermined amount of fuel and air chemically reacted;

a fuel storage reservoir communicated with said membrane electrode assembly and adapted for storing said fuel to supply to said membrane electrode assembly for generating said electricity;

an air supply unit communicated with said membrane electrode assembly for supplying said air with a predetermined pressure to said membrane electrode assembly for generating said electricity, wherein said air is naturally drawn from ambient atmosphere so as to contain dirt particles and organic oily molecules;

a temperature regulator communicated with said membrane electrode assembly to control a temperature therein for ensuring efficient generation of said electricity; and a particulates blocking device which is connected with said membrane electrode assembly and comprises an multi-layer air filtering unit communicated with said air supply unit, wherein said air filtering unit comprises a particle filter layer having a plurality of porous gratings formed thereon for allowing said dirt particles which are smaller than a size of said gratings to pass therethrough, and a molecular filler layer having a plurality of filler grains chemically bound together for absorbing said organic oily molecules so as to block said organic oily molecules from entering into said membrane electrode assembly for maximizing an efficiency of said fuel cell.

2. The fuel cell, as recited in claim 1, wherein said molecular filler layer and said particle filter layer of said multi-layer air filtering unit are arranged in a side-by-side manner wherein said air from said air supply unit is first driven to pass through said particle filter layer for filtering out said dirt particles, and then to said molecular filler layer for absorbing said organic oily molecules so as to ensure a maximum efficiency and effectiveness of said particulates blocking device.

3. The fuel cell, as recited in claim 1, wherein each of said porous gratings of said particle filter layer has a size at most equals one millimeter such that said dirt particles having a size greater than that of said porous gratings are blocked by said particle filter layer so as to filter said dirt particles from said air.

4. The fuel cell, as recited in claim 2, wherein each of said porous gratings of said particle filter layer has a size at most equals one millimeter such that said dirt particles having a size greater than that of said porous gratings are blocked by said particle filter layer so as to filter said dirt particles from said air.

5. The fuel cell, as recited in claim 1, wherein said filler grains are activated carbon molecules which have a chemical feature adhesive to said organic oily molecules so as to absorb said organic oily molecules from said air for substantially preventing said organic oily molecules from entering into said membrane electrode assembly.

6. The fuel cell, as recited in claim 3, wherein said filler grains are activated carbon molecules which have a chemical feature adhesive to said organic oily molecules so as to absorb said organic oily molecules from said air for substantially preventing said organic oily molecules from entering into said membrane electrode assembly.

7. The fuel cell, as recited in claim 4, wherein said filler grains are activated carbon molecules which have a chemical feature adhesive to said organic oily molecules so as to absorb said organic oily molecules from said air for substantially preventing said organic oily molecules from entering into said membrane electrode assembly.

8. The fuel cell, as recited in claim 4, wherein said air supply unit comprises an air compressor communicated between said membrane electrode assembly and said particulates blocking device, wherein said air compressor draws a predetermined amount of said air from said ambient atmosphere which first passes through said particulates blocking device for clearance of said dirt particulates and said organic oily molecules, and supplies said filtered air to said membrane electrode assembly to generate electricity.

9. The fuel cell, as recited in claim 6, wherein said air supply unit comprises an air compressor communicated between said membrane electrode assembly and said particulates blocking device, wherein said air compressor draws a predetermined amount of said air from said ambient atmosphere which first passes through said particulates blocking device for clearance of said dirt particulates and said organic oily molecules, and supplies said filtered air to said membrane electrode assembly to generate electricity.

10. The fuel cell, as recited in claim 7, wherein said air supply unit comprises an air compressor communicated between said membrane electrode assembly and said particulates blocking device, wherein said air compressor draws a predetermined amount of said air from said ambient atmosphere which first passes through said particulates blocking device for clearance of said dirt particulates and said organic oily molecules, and supplies said filtered air to said membrane electrode assembly to generate electricity.

11. The fuel cell, as recited in claim 8, wherein said temperature regulator comprises a water tank adapted for storing a predetermined amount of water, a heat sink, and a water pump connected between said water tank and said heat sink, wherein said water at a lower temperature is pumped from said water tank to said membrane electrode assembly for absorbing heat therefrom to become a higher temperature, and is then driven to pass through said heat sink which extracts heat absorbed from said membrane electrode assembly to resume said water into said lower temperature, and finally pumped back into said water tank.

12. The fuel cell, as recited in claim 9, wherein said temperature regulator comprises a water tank adapted for storing a predetermined amount of water, a heat sink, and a water pump connected between said water tank and said heat sink, wherein said water at a lower temperature is pumped from said water tank to said membrane electrode assembly for absorbing heat therefrom to become a higher temperature, and is then driven to pass through said heat sink which extracts heat absorbed from said membrane electrode assembly to resume said water into said lower temperature, and finally pumped back into said water tank.

13. The fuel cell, as recited in claim 10, wherein said temperature regulator comprises a water tank adapted for storing a predetermined amount of water, a heat sink, and a water pump connected between said water tank and said heat sink, wherein said water at a lower temperature is pumped from said water tank to said membrane electrode assembly for absorbing heat therefrom to become a higher temperature, and is then driven to pass through said heat sink which extracts heat absorbed from said membrane electrode assembly to resume said water into said lower temperature, and finally pumped back into said water tank.

14. The fuel cell, as recited in claim 11, further comprising a pressure regulator communicated between said fuel storage reservoir and said membrane electrode assembly to controllably releasing hydrogen gas from said fuel storage reservoir to said membrane electrode assembly for optimally controlling a rate of chemical reaction taken place inside said membrane electrode assembly.

15. The fuel cell, as recited in claim 12, further comprising a pressure regulator communicated between said fuel storage reservoir and said membrane electrode assembly to controllably releasing hydrogen gas from said fuel storage reservoir to said membrane electrode assembly for optimally controlling a rate of chemical reaction taken place inside said membrane electrode assembly.

16. The fuel cell, as recited in claim 13, further comprising a pressure regulator communicated between said fuel storage reservoir and said membrane electrode assembly to controllably releasing hydrogen gas from said fuel storage reservoir to said membrane electrode assembly for optimally controlling a rate of chemical reaction taken place inside said membrane electrode assembly.

17. The fuel cell, as recited in claim 14, further comprising a chemical separator comprising a gas separator communicated with an outlet of said membrane electrode assembly for extracting hydrogen gas therefrom, and feeding said hydrogen gas back to said fuel storage reservoir for recycling use of said hydrogen gas, and a liquid separator communicated with said membrane electrode assembly for retrieving air therefrom and discharging said air to said ambient from said fuel cell.

18. The fuel cell, as recited in claim 15, further comprising a chemical separator comprising a gas separator communicated with an outlet of said membrane electrode assembly for extracting hydrogen gas therefrom, and feeding said hydrogen gas back to said fuel storage reservoir for recycling use of said hydrogen gas, and a liquid separator communicated with said membrane electrode assembly for retrieving air therefrom and discharging said air to said ambient from said fuel cell.

19. The fuel cell, as recited in claim 16, further comprising a chemical separator comprising a gas separator communicated with an outlet of said membrane electrode assembly for extracting hydrogen gas therefrom, and feeding said hydrogen gas back to said fuel storage reservoir for recycling use of said hydrogen gas, and a liquid separator communicated with said membrane electrode assembly for retrieving air therefrom and discharging said air to said ambient from said fuel cell.

20. The fuel cell, as recited in claim 19, wherein said air filtering unit further comprises a plurality of said molecular filler layers which are adapted to absorb organic oily molecules so as to ensure that said air entering into said membrane electrode assembly is optimally filtered.

* * * * *